United States Patent
Marsilia et al.

(10) Patent No.: US 12,304,456 B2
(45) Date of Patent: May 20, 2025

(54) METHOD FOR TEMPORARILY EXTENDING THE AUTONOMY OF AN ELECTRIC VEHICLE

(71) Applicant: RENAULT s.a.s., Boulogne-Billancourt (FR)

(72) Inventors: Marco Marsilia, Cachan (FR); Richard Pothin, Jouars Pontchartrain (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 679 days.

(21) Appl. No.: 17/270,650

(22) PCT Filed: Jul. 19, 2019

(86) PCT No.: PCT/EP2019/069505
§ 371 (c)(1),
(2) Date: Feb. 23, 2021

(87) PCT Pub. No.: WO2020/043392
PCT Pub. Date: Mar. 5, 2020

(65) Prior Publication Data
US 2021/0188248 A1 Jun. 24, 2021

(30) Foreign Application Priority Data
Aug. 30, 2018 (FR) ...................... 18 70969

(51) Int. Cl.
*H04Q 9/00* (2006.01)
*B60W 20/13* (2016.01)
(Continued)

(52) U.S. Cl.
CPC ............ *B60W 20/16* (2016.01); *B60W 20/13* (2016.01); *B60W 20/20* (2013.01); *B60W 20/40* (2013.01)

(58) Field of Classification Search
CPC ...... B60W 20/16; B60W 20/13; B60W 20/20; B60W 20/40; B60L 2250/12;
(Continued)

(56) References Cited

U.S. PATENT DOCUMENTS 8,941,463 B2 * 1/2015 Rovik ..................... B60L 53/65
340/5.1
10,807,492 B1 * 10/2020 Holland ................. B60L 53/60
(Continued)

FOREIGN PATENT DOCUMENTS

WO  WO 2016/095114 A1  6/2016

OTHER PUBLICATIONS

International Search Report issued on Sep. 19, 2019 in PCT/EP2019/069505 filed on Jul. 19, 2019, 2 pages.
(Continued)

*Primary Examiner* — Masud Ahmed
(74) *Attorney, Agent, or Firm* — Oblon, McClelland, Maier & Neustadt, L.L.P.

(57) ABSTRACT

A method temporarily extends the autonomy of an electric vehicle including a traction battery having a nominal usable energy capacity that is less than its maximum actual energy capacity. The method includes an additional usable capacity release step so as to temporarily increase the autonomy of the vehicle.

15 Claims, 4 Drawing Sheets

(51) Int. Cl.
*B60W 20/16* (2016.01)
*B60W 20/20* (2016.01)
*B60W 20/40* (2016.01)

(58) Field of Classification Search
CPC .. B60L 2250/16; B60L 2260/52; B60L 50/60; Y02T 10/70; Y02T 10/72; B60Y 2200/91
See application file for complete search history.

(56) References Cited

U.S. PATENT DOCUMENTS

| | | | | |
|---|---|---|---|---|
| 2011/0166733 | A1* | 7/2011 | Yu | B60W 20/13 |
| | | | | 180/65.265 |
| 2012/0157083 | A1* | 6/2012 | Otterson | B60L 55/00 |
| | | | | 455/422.1 |
| 2012/0158227 | A1* | 6/2012 | Tate, Jr. | B60W 10/26 |
| | | | | 701/22 |
| 2013/0249276 | A1* | 9/2013 | Rovik | B60L 3/12 |
| | | | | 307/9.1 |
| 2019/0288347 | A1* | 9/2019 | Yokoyama | B60L 50/60 |

OTHER PUBLICATIONS

Preliminary French Search Report issued on May 22, 2019 in French Application No. 18 70969 filed on Aug. 30, 2019, 2 pages.

\* cited by examiner

Release of energy

METHOD FOR TEMPORARILY EXTENDING THE AUTONOMY OF AN ELECTRIC VEHICLE

The present invention relates to a method for temporarily extending the autonomy of an electric vehicle.

In the current context of consensus opinion concerning global warming, reducing carbon dioxide ($CO_2$) emissions is a major challenge confronting motor vehicle constructors, with the standards being increasingly demanding in this regard.

In addition to constantly improving the efficiencies of conventional heat engines, which is accompanied by a lowering of $CO_2$ emissions, electric vehicles ("EV", for "Electric Vehicle") and hybrid heat-electric vehicles ("HEV", for "Hybrid Electric Vehicle") are these days considered to be the most promising solution for reducing $CO_2$ emissions. Various electric energy management technologies have been tested in recent years, in order to meet the EV and HEV requirements. For example, lithium-ion (li-ion) batteries offer an excellent trade-off between energy density, which favors autonomy, and power density, which favors performance, in terms of acceleration in particular. That is why they are very routinely chosen as "traction battery" to power the electric motor of an EV or of an HEV.

One brake to the expansion of EVs remains their autonomy, which is still limited if compared to the autonomy of heat-powered vehicles. That is a problem that the present invention sets out to resolve.

The state of the art teaches different strategies for permanently increasing the autonomy of EVs, notably in order to improve the capacity of the batteries and the efficiency of the electric machines.

Other strategies target temporarily increasing the autonomy of EVs, in some exceptional usage cases, by what are referred to as "range-extenders". This can be a thermal extender, such as on the NISSAN Note e-Power, which operates as a generator set from a fossil fuel. It can also be an extender of fuel cell type, as in the document DE202017003371U, which operates using liquid hydrogen. It can also be an extender of metal-air battery type, as in the document FR3027259A1. One major drawback with these solutions is their complexity and their implementation cost, as well as the need to regularly top up the extender, whether it be with petrol, hydrogen, or even aluminum plates, which at the very least entails the trip to a station, or even a maintenance operation. That is a drawback that the present invention proposes to avoid.

The aim of the present invention is notably to remedy the abovementioned drawbacks. To this end, the subject of the invention is a method for temporarily extending the autonomy of an electric vehicle comprising a traction battery having a nominal usable energy capacity which is less than its maximum real energy capacity. The method comprises a step of releasing additional usable capacity, so as to temporarily increase the autonomy of the vehicle.

Advantageously, the capacity releasing step can include calculating the current maximum real capacity and selecting, via a human-machine interface, notably a smartphone or a tablet, a released capacity value to be added to the nominal usable capacity within the limit of the calculated maximum real capacity. Thus, the user benefits from great flexibility in use of the reserve allowing him or her to adapt the capacity extension to his or her real needs and budget. In addition, such capacity to best modulate the capacity extension tends to preserve the maximum capacity of the battery over time and therefore the durability of the battery.

Also advantageously, the capacity releasing step can include a step of selection, via a human-machine interface, notably a smartphone or a tablet, of releasing criteria on expiry of which the usable capacity reverts to the nominal usable capacity. For example, the releasing criteria can include a time criterion. Thus, the user benefits from a reliability of use guaranteeing him or her that the capacity extension will never be used beyond his or her real needs and budget. Such a functionality limits the risks of unnecessarily prolonging the capacity extension and there again tends to preserve the maximum capacity of the battery over time and therefore the durability of the battery.

Also advantageously, if the vehicle is running to a final destination that is known in advance, then, on expiry of the releasing criteria, the usable capacity can revert to the nominal usable capacity only when the vehicle actually reaches this final destination.

In one embodiment, the step of selection of the released capacity value can include communicating, by display or by audible means, an additional autonomy value corresponding to the selected capacity value.

The steps of selection of the released capacity value and/or of the releasing criteria can also include communicating, by display or by audible means, an amount to be paid corresponding to the selected values.

Also a subject of the present invention is a system comprising hardware and software means for implementing all the steps of such a method.

Finally, the subject of the present invention is a vehicle including such a system.

In addition to not requiring any top-up or maintenance operation, the main advantage of the invention described previously is also its simplicity of implementation, since it can be implemented in any current electric vehicle including a battery computer and a vehicle computer.

Other features and advantages of the invention will become apparent from the following description given in light of the attached figures which represent one and the same exemplary embodiment of the invention, in which.

In these figures, the same references represent the same elements.

These days, the new generation EV traction batteries offer a greater capacity than in the past, at a more affordable price. It is becoming possible for the motor vehicle constructors to offer an EV range that is diversified in terms of nominal capacity. For its part, the applicant envisages proposing, for one and the same EV model, two different versions including the same battery having a real capacity (i.e. physical capacity) of 52 kWh: one version having a nominal capacity (i.e. sold to the client) of 30 kWh and another version having a nominal capacity of 52 kWh. The description below describes an innovative method for managing the energy and motive power of an EV offering the driver an innovative service for temporarily extending the nominal capacity, based on the fact that the battery has a real capacity which is greater than its nominal capacity.

The general principle of the method is to offer the driver of an EV in which the battery has a real capacity greater than the nominal capacity, the option to purchase, when he or she wishes and when it is physically possible, so as to obtain additional capacity, that will be made available for a determined time period and/or in determined conditions.

In an advantageous embodiment, the driver can, for example, choose from among several options, via the dashboard of the vehicle or via his or her smartphone.

For example, the driver can choose the quantity of additional energy that he or she wants to release, within a limit which depends on the real situation and which is communicated to him or her at any moment by the computer of the vehicle to his or her smartphone or to the dashboard.

He or she can also choose the energy releasing time. He or she can choose a single use to end the current trip for example, and in this case the capacity will revert to the nominal capacity upon the next charge. This option is useful in the case where the user notices that he or she does not have enough autonomy to reach his or her destination. The existence of such a service thus provides the driver with the reassurance to counter the fear of an immobilizing failure. He or she can also choose a determined time, such as 24 hours, a weekend or a week. In this case, he or she will for example be able to conserve the extended capacity until the charge which follows the end of the chosen time. The fact of authorizing the return to nominal capacity only upon a charge provides an assurance that the driver will never suffer the unpleasant surprise of reduced autonomy during a trip, even if the releasing time that he or she has chosen has expired.

For that, the method described hereinbelow manages, with respect to a nominal capacity for the client that is less than or equal to the real capacity of the battery and variable in time as a function of the choices of the user: the traction power, the state of charge (or "SOC" for "State Of Charge"), the autonomy and the stopping of charging.

Figure 1:
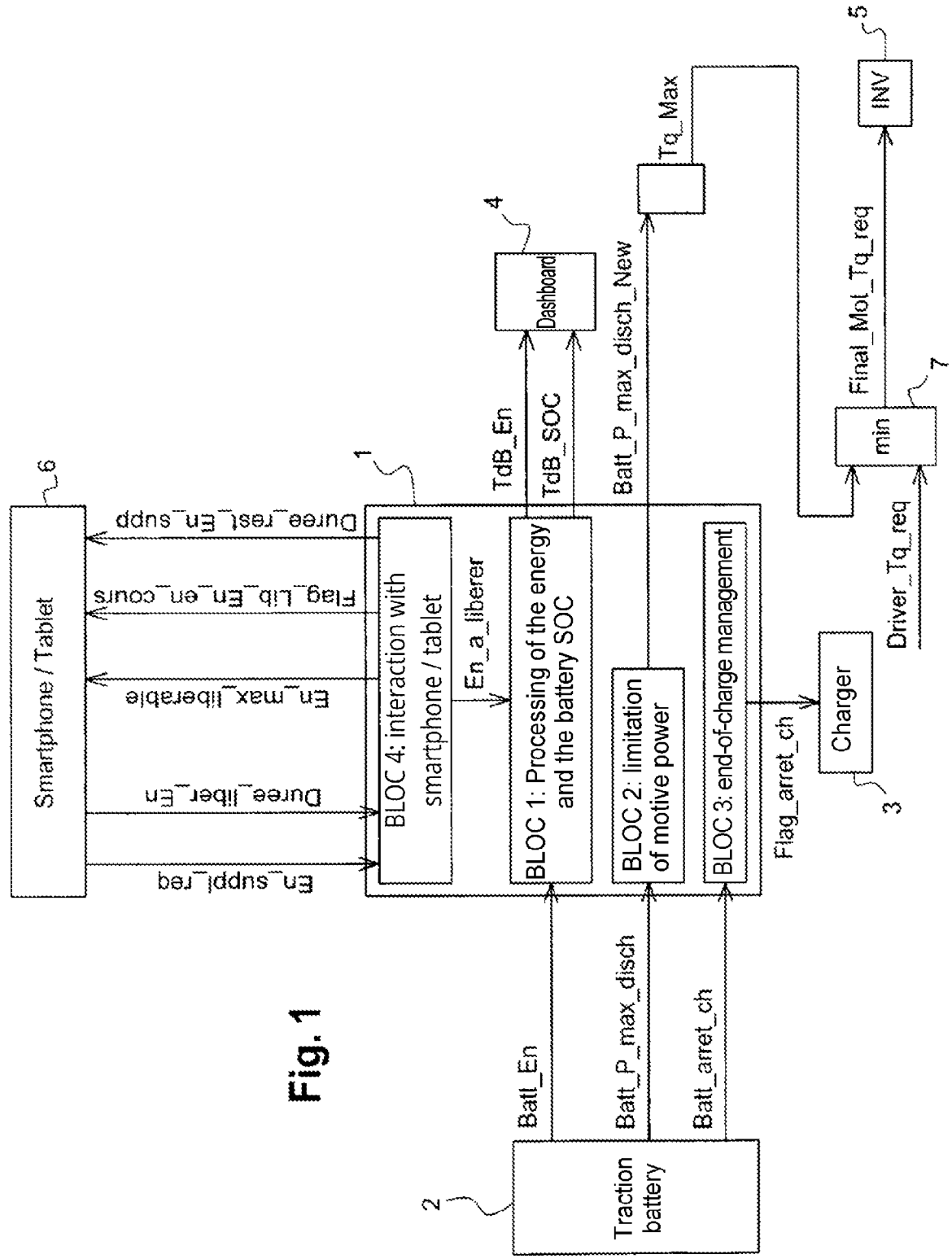
FIG. 1 illustrates an exemplary architecture of an electric vehicle.

FIG. 1 illustrates, by a diagram, an exemplary architecture that can implement the method according to the invention in an electric vehicle. This diagram notably illustrates a part of the vehicle architecture: a vehicle controller 1, communicating with a traction battery 2 including its own computer, a charger 3, a dashboard 4 and an inverter 5. The inverter 5 makes it possible to produce the torque with the electric machine, not illustrated in [FIG. 1].

The controller 1 executes various processes, notably a bloc 1 for processing the energy and the SOC of the battery 2, a bloc 2 for processing the limiting of the motive power requested of the inverter 5, a bloc 3 for managing the end of charge of the battery 2, and a bloc 4 for managing interactions with a smartphone or a tablet 6.

The BLOC 1 for processing the energy and the SOC receives as input a signal Batt_En emitted by the computer of the traction battery 2, which represents the physical level of energy of the battery 2 at the present instant in kilowatts per hour (kWh). The BLOC 1 also receives as input a signal En_a_liberer emitted by the BLOC 4, which represents the quantity of additional energy to be released in kWh.

The BLOC 1 produces as output a signal TdB_SOC to the dashboard 4 for display to the driver, which represents the SOC level after processing. This is a value between 0% and 100%. It is also used by the rest of the embedded software strategies. It corresponds to just the SOC level known by the driver.

The BLOC 1 also produces as output a signal TdB_En to the dashboard 4 for display to the driver, which represents the battery energy level after processing in kWh. It will also be used by the rest of the embedded software strategies, notably for estimating the remaining autonomy displayed to the driver.

These signals are obtained according to the following equations:

$$\text{TdB\_SOC} = 100 \cdot \left(\frac{\text{TdB\_En}}{\text{useful\_capacity}}\right) \qquad \text{[Math. 1]}$$

in which useful_capacity is a parameter which corresponds to the nominal capacity (less than the physical capacity of the battery), and:

$$TdB\_En = \max(0; E\_AvailDisch\_New\_No\_Sat) \qquad \text{[Math 2]}$$

with $$\begin{aligned}E\_AvailDisch\_New\_No\_Sat = {} & Batt\_En - \\ & En\_reelle\_0\%\_SOC\_New\end{aligned} \qquad \text{[Math 3]}$$

The signal En_reelle_0%_SOC_New represents the physical quantity of energy that the battery has when TdB_SOC is 0%. It is obtained according to the following equation:

$$\text{[Math 4]}$$
$$En\_reelle\_0\%\_SOC\_New(t) =$$
$$\begin{cases} \max\{0;[En\_reelle\_0\%\_SOC\_New(t-1) - \\ \quad En\_a\_liberer(t)]\} \text{ if } En\_a\_liberer(t) \neq En\_a\_liberer(t-1) \\ En\_reelle\_0\%\_SOC\_New(t-1) \text{ otherwise} \end{cases}$$

The signal En_a_liberer is produced by the BLOC 4 in the manner described in the paragraph below explaining the operation of BLOC 4.

The BLOC 2 limits the motive power and therefore the motor torque when TdB_SOC and TdB_En are low. This limitation is managed so that the motive power decreases progressively as TdB_SOC decreases, so as not to surprise the driver. This BLOC 2 produces as output a signal Batt_P_max_disch_New which will limit the maximum electrical power and therefore the maximum torque Tq_Max that can be produced by the electric machine via the inverter 5. This signal Batt_P_max_disch_New is obtained according to the following equations:

$$\begin{aligned}Batt\_P\_max\_disch\_New = {} & \min\{Batt\_P\_max\_disch; \\ & \max[P\_Bat\_Disch\_Min; (P\_Bat\_Disch\_Avail\_En0 + \\ & E\_AvailDisch\_New\_No\_Sat \cdot dP\_Bat\_Disch\_dEn)]\}\end{aligned} \qquad \text{[Math 5]}$$

The final torque request to the inverter 5 Final_Mot_Tq_req is calculated in a module 7 as the minimum between the torque request from the driver Driver_Tq_req and the maximum producible torque Tq_Max given the power limitation "Batt_P_Max_disch_New".

The BLOC 2 receives as input from the battery 2 the signal Batt_P_max_disch which represents the maximum discharge power in kilowatts (kW) that the traction battery 2 is physically capable of providing. The parameters for setting the strategy are:
P_Bat_Disch_Avail_En0 which represents the discharge power in kW still available when the battery energy AFTER PROCESSING is 0 kWh;

dP_Bat_Disch_dEn which represents the slope of decreasing battery discharge power available as a function of the battery energy level, in kW per kWh (kW/kWh);

P_Bat_Disch_Min which represents the remaining discharge power for the power limitation in kW/kWh.

Figure 2:
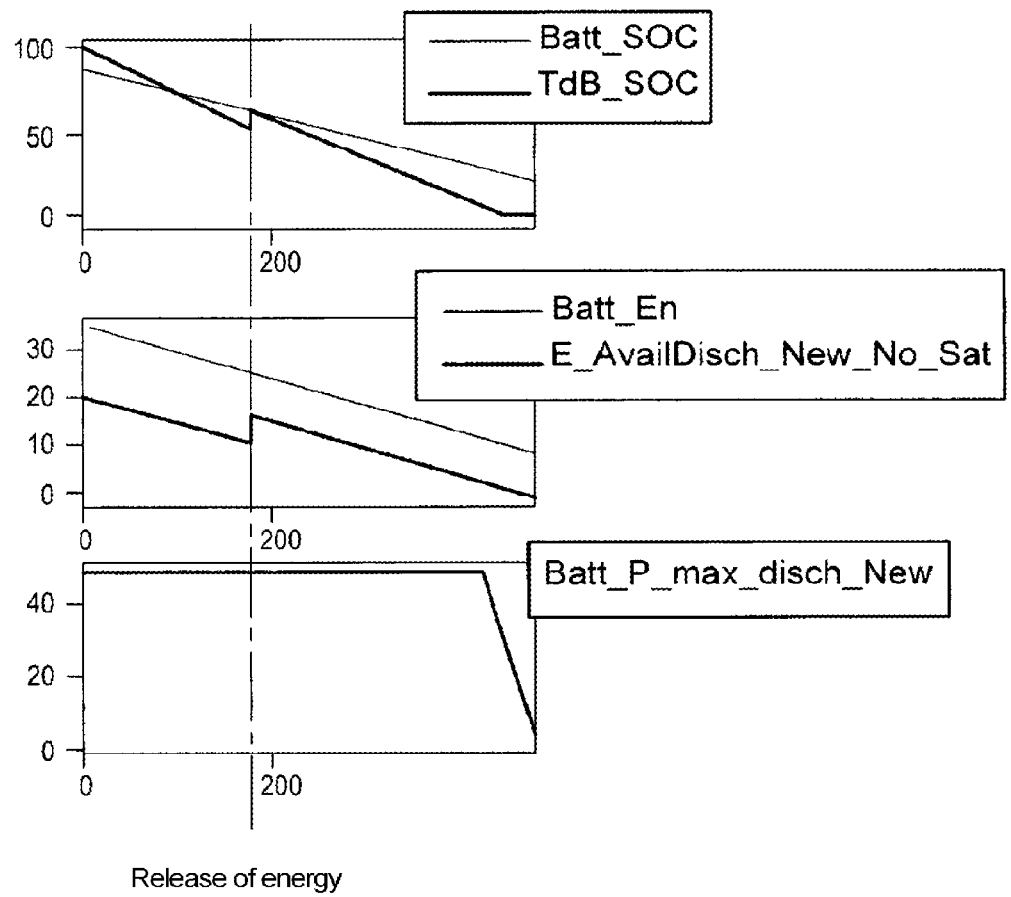
FIG. 2 illustrates an example of motive power changes according to one embodiment.

FIG. 2 illustrates an example of motive power limitation by the BLOC 2. Note that the motive power "Batt_P_Max_disch_New" decreases progressively as "TdB_SOC" approaches 0. In [FIG. 2], it will be noted that when "TdB_SOC" reaches the value 0, the power "Batt_P_Max_disch_New" is greater than 0 which allows the driver to run for a few more meters. "Batt_P_Max_disch_New" then reaches the value 0 ("dry" failure) shortly after TdB_SOC=0 if the driver continues to roll.

The BLOC 3 manages the stopping of the charging of the battery 2 by producing, for the charger 3, a boolean signal Flag_arret_ch which takes the value 1 when the charge must be stopped, 0 otherwise. This signal is constructed according to the following logic:

$$\text{Flag\_arret\_ch} = \begin{cases} 1 \text{ if TdB\_SOC} \geq 100\% \text{ OR Batt\_arret\_ch} = |1, \\ 0 \text{ otherwise} \end{cases} \quad \text{[Math 6]}$$

in which Batt_arret_ch is a boolean sent by the battery 2 which takes the value 1 when the battery 2 requests the stopping of the charge.

The BLOC 4 manages the interaction between the vehicle computer 1 and a smartphone or a tablet 6 belonging to the driver. This BLOC 4 receives as inputs the following signals emitted by the smartphone or the tablet 6:

En_suppl_req which is sent by the smartphone or tablet 6 and represents the quantity of energy in kWh that the user wants to release;

Duree_liber_En which is sent by the smartphone or the tablet 6 and represents the time in minutes for which the driver wants to release the additional energy.

If the maximum authorized releasing time is X minutes, then the range of possible values for this signal must be [0; X]. The value 0 is then assigned the following meaning: the driver requests releasing additional capacity until the next charge, that is to say to finish the current trip. In this case, the capacity will revert to nominal capacity upon the next charge, that is to say as soon as the driver has reached a charge point.

The driver can also request the release of the quantity of additional energy En_suppl_req for a time Duree_liber_En directly via his or her telephone or tablet 6 or via the dashboard of the car. The BLOC 4 produces as output to the smartphone or the tablet 6, for the driver to be informed by display on said smartphone or tablet 6, the following signals:

- The boolean Flag_Lib_En_en_cours, which takes the value 1 when the releasing of additional energy with respect to the nominal value is in progress, and which takes the value 0 otherwise;
- Duree_rest_En_supp, which indicates in real time to the driver for how long he or she will still benefit from the extended capacity;
- En_max_liberable, which indicates in real time to the driver the maximum quantity of additional energy that he or she can release. This quantity is linked to the physical capacity of the system and is communicated at each instant by the computer 1 to the smartphone or to the tablet 6. In a variant embodiment, one possibility is to allow the driver to choose the quantity of energy to be released via a gauge whose maximum value corresponds to the signal En_max_liberable.

Figure 3:
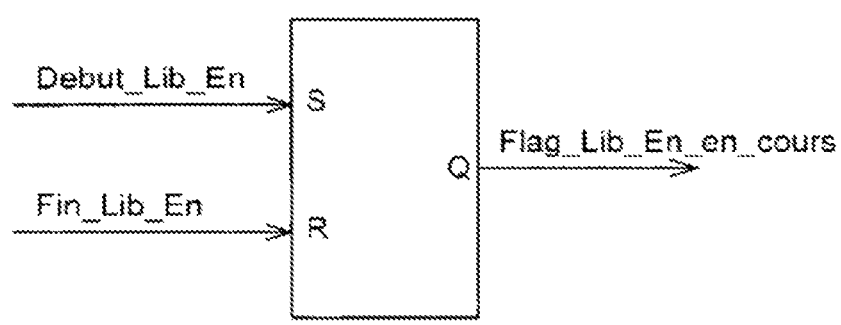
FIG. 3 illustrates a set/reset switch.

As illustrated by [FIG. 3], the signal Flag_Lib_En_en_cours can be obtained as the output of a "Set/Reset" (S/R) switch. The input S of the switch corresponds to a boolean signal Debut_Lib_En. When the latter takes the value 1, the releasing of the additional energy begins. The input R of the switch corresponds to a boolean signal Fin_Lib_En. The passage thereof to the value 1 marks the end of the releasing of the additional energy.

The boolean signal Debut_Lib_En is obtained according to the following equation:

$$\text{Debut\_Lib\_En} = (\text{En\_suppl\_req} > 0) \text{ AND} \quad \text{[Math 7]}$$
$$(\text{NOT Flag\_Lib\_En\_en\_cours}) \text{ AND}$$
$$(\text{NOT Flag\_charge})$$

in which Flag_charge is a boolean which takes the value 1 when a charge of the vehicle is underway, 0 otherwise. The releasing of energy therefore begins, if the vehicle is not charging and a releasing of energy is not already in progress, when the driver requests a positive additional energy En_suppl_req via his or her smartphone or tablet 6, or even via the dashboard 4.

The boolean signal Fin_Lib_En is obtained according to the following equation:

$$\text{Fin\_Lib\_En} = \begin{cases} \text{Flag\_charge if Duree\_utilisateur} = 0 \\ \text{Flag\_charge AND Duree\_En\_suppl} > \\ \quad \text{Duree\_utilisateur otherwise} \end{cases} \quad \text{[Math 8]}$$

in which:

$$\text{Duree\_utilisateur}(t) = \begin{cases} \text{Duree\_liber\_En}°(t) \text{ if} \\ \quad \text{Flag\_Lib\_En\_en\_cours} = 0, \\ \text{Duree\_utilisateur}(t-1) \text{ otherwise} \end{cases} \quad \text{[Math 9]}$$

$$\text{Duree\_En\_suppl} = \text{T\_absol} - \text{T\_debut} \quad \text{[Math 10]}$$

in which T_absol is a continuous counter internal to the embedded computer which gives the absolute time (from the first awakening in the life of the computer) and in which:

$$\text{T\_debut}(t) = \begin{cases} \text{T\_absol}(t) \text{ if Flag\_Lib\_En\_en\_cours} = 0 \\ \text{T\_debut}(t-1) \text{ otherwise} \end{cases} \quad \text{[Math 11]}$$

The signal En_a_liberer sent to the *BLOC* 1 is obtained thus:

$$\text{En\_a\_liberer} = \begin{cases} 0 \text{ if Flag\_Lib\_En\_en\_cours} = 0 \\ \text{En\_a\_liberer\_mem otherwise} \end{cases} \quad \text{[Math 12]}$$

where:

$$\text{En\_a\_liberer\_mem}(t) = \begin{cases} \text{En\_suppl\_req if} \\ \quad \text{Flag\_Lib\_En\_en\_cours}(t-1) = 0 \\ \text{En\_a\_liberer\_mem}(t-1) \text{ otherwise} \end{cases} \quad \text{[Math 13]}$$

The output signal Duree_rest_En_supp, sent to the smartphone or to the tablet 6 is obtained as follows:

$$\text{Duree\_rest}\_{En}\_\text{supp} = \text{Duree\_utilisateur} - \text{Duree}\_{En}\_\text{suppl} \quad [\text{Math 14}]$$

Figure 4:
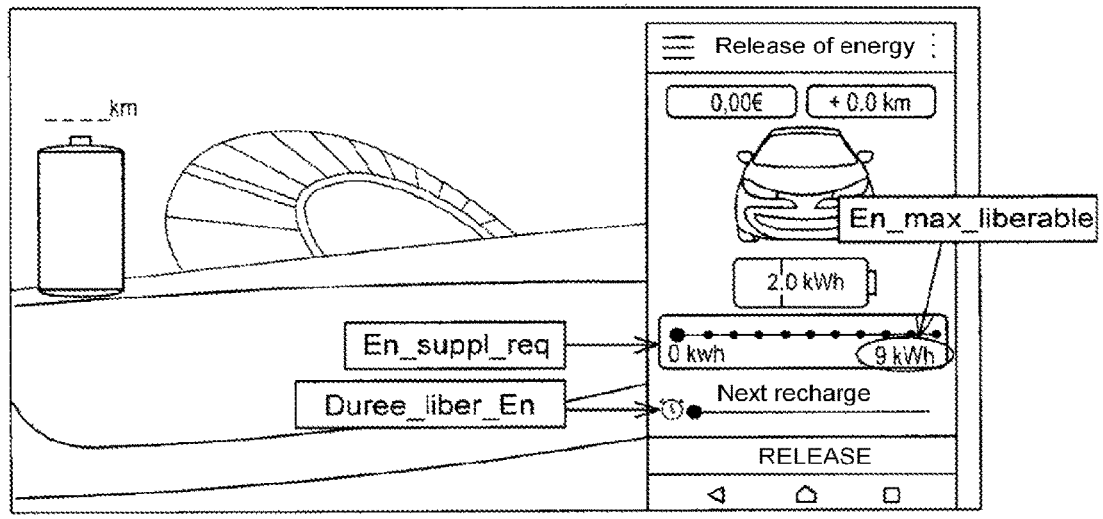
FIG. 4 illustrates one example of a human-machine interface on a smartphone or tablet.
Figure 5:
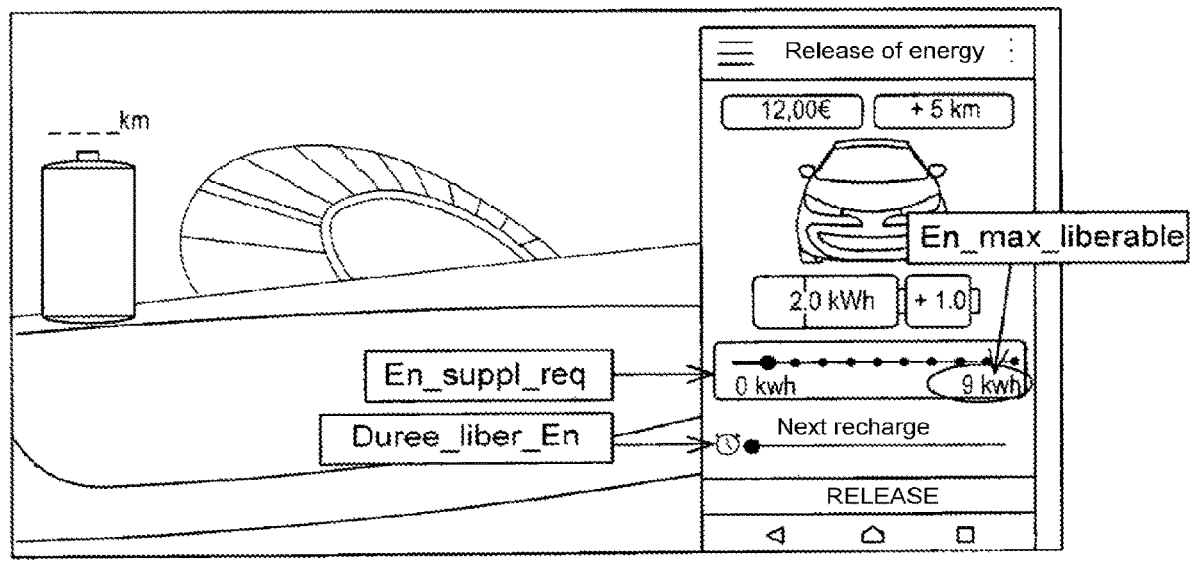
FIG. 5 illustrates another example of the human-machine interface.

This embodiment has several consequences. A first consequence is that if the driver chooses the option to "finish current trip" (i.e. Duree_liber_En=0), then the capacity of the battery will revert to the nominal capacity as soon as he or she has connected his or her car to the charger (as soon as he or she has reached a recharge point). This option is practical in the case where the driver notices that he or she does not have enough autonomy to reach his or her destination. The availability of such a service also makes it possible to reassure the driver with respect to the fear of an immobilizing failure. Thus, [FIG. 4] and [FIG. 5] illustrate an example of human-machine interface on the smartphone or the tablet 6 allowing the driver to adjust the energy releasing parameters, with two cursors making it possible to choose En_suppl_req within the limit of En_max_liberable, and Duree_liber_En. In this example, for 1 kWh of additional capacity purchased for 12 euros (of 9 kWh available in total), the driver is informed that he or she has gained 5 kilometers (km) of autonomy, available until the next recharge only.

Figure 6:
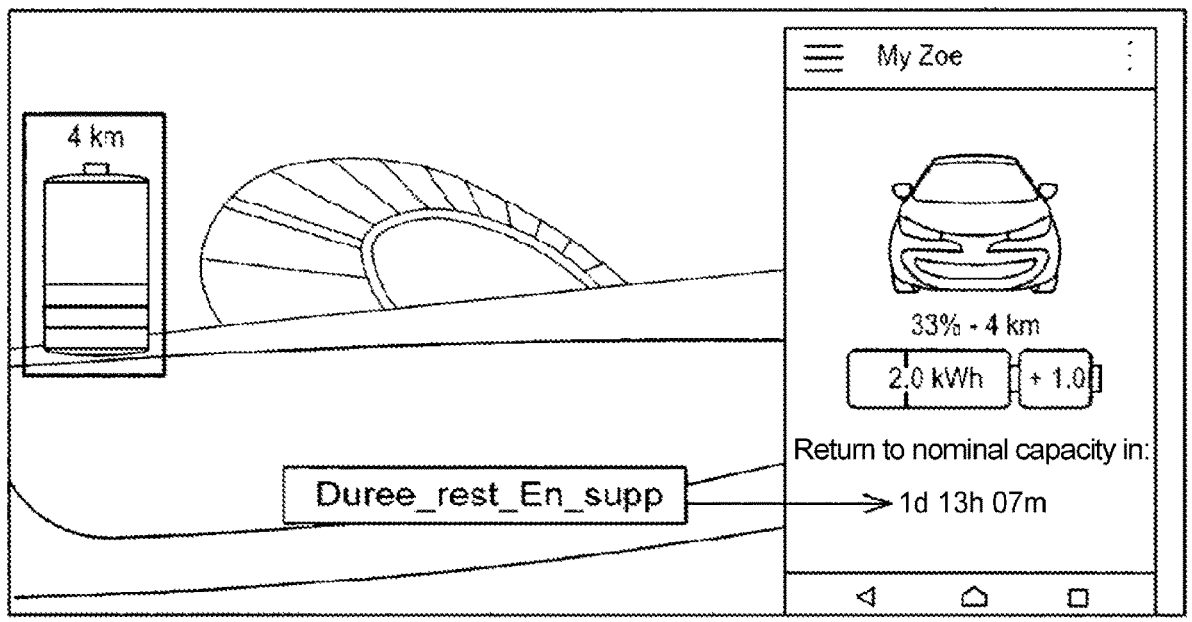
FIG. 6 illustrates another example of the human-machine interface.

Another consequence is that, if the driver chooses a time (for example two days or a week) then he or she will retain the extended capacity until the charge which follows the end of the chosen time. The fact of authorizing the return to nominal capacity only upon a charge ensures that the driver will never suffer the unpleasant surprise of loss of autonomy while running, even if the releasing time that he or she has chosen has expired. Thus, [FIG. 6] illustrates an example of human-machine interface on the smartphone or the tablet 6 when the releasing of energy is in progress, notably displaying Duree_rest_En_supp with a value of 1 day, thirteen hours and 7 minutes.

The output signal En_max_liberable sent to the smartphone or to the tablet 6 is obtained according to the following equations:

$$\text{En\_Max\_liberable} = \begin{cases} 0 \text{ if Flag\_Lib\_En\_en\_cours OR} \\ \quad \text{Flag\_charge} \\ \max\{0; \text{En\_reelle\_0\%\_SOC\_New} - \\ \quad \text{En\_pas\_liberable}\} \text{ otherwise} \end{cases} \quad [\text{Math 15}]$$

in which En_pas_liberable is a positive or zero setting parameter which represents the quantity of energy of the battery 2, compared to its real physical capacity, that is not allowed to be released and in which En_reelle_0%_SOC_New is a signal which represents the physical quantity of energy that the battery 2 has available when the SOC after processing (TdB_SOC) is 0%. It is obtained as described above.

The invention claimed is:

1. A method for temporarily extending an autonomy of an electric vehicle comprising a traction battery having a nominal usable energy capacity that is less than a current maximum real energy capacity of the traction battery, the method comprising:
 calculating, by processing circuitry of the electric vehicle, the current maximum real energy capacity;
 causing a display of the electric vehicle or a display of a device of an operator of the electric vehicle to display a graphical user interface (GUI) that displays (1) the calculated current maximum real energy capacity, and (2) a first input element that allows the operator to select an arbitrary additional capacity that is less than or equal to, but not greater than, the displayed current maximum real energy capacity and is to be added to the nominal usable energy capacity;
 receiving a selection, by the operator via the GUI, of the arbitrary additional energy capacity to be added to the nominal usable energy capacity;
 causing the GUI to display the calculated current maximum real energy capacity together with the selected additional energy capacity selected by the operator; and
 releasing the selected arbitrary additional capacity, so as to temporarily increase the autonomy of the vehicle.

2. The method as claimed in claim 1, wherein the human-device of the operator is a smartphone or a tablet.

3. The method as claimed in claim 1, further comprising selecting, via the GUI, releasing criteria, on expiry of which a usable capacity reverts to the nominal usable energy capacity.

4. The method as claimed in claim 3, wherein the device of the operator is a smartphone or a tablet.

5. The method as claimed in claim 3, wherein the releasing criteria include a time criterion.

6. He method as claimed in claim 3, wherein, when a final destination of the vehicle is known in advance, then, on expiry of the releasing criteria, the usable capacity reverts to the nominal usable energy capacity only when the vehicle actually reaches the final destination.

7. The method as claimed in claim 1, wherein the selecting the additional energy capacity includes communicating, by display or by audible means, an additional autonomy value corresponding to the selected additional energy capacity.

8. The method as claimed in claim 1, further comprising causing the GUI to display an amount to be paid for the selected additional energy capacity selected by the operator.

9. The method as claimed in claim 3, wherein at least one of the selecting the additional energy capacity and the releasing criteria includes communicating, by display or by audible means, an amount to be paid corresponding to the selected at least one of the additional energy capacity and the releasing criteria.

10. A non-transitory computer-readable medium storing a program that, when executed by a computer, causes the computer to execute the method as claimed in claim 4.

11. A vehicle comprising the computer-readable medium as claimed in claim 10.

12. The method of claim 1, further comprising causing the GUI to display a second input element that allows the operator to input a length of time over which the selected additional energy capacity will be retained.

13. The method of claim 12, further comprising, after releasing the selected additional capacity, causing the GUI to display a remaining time for retaining the selected additional energy capacity, the displayed remaining time being less than the input length of time.

14. The method of claim 1, wherein the first input element includes a slidable cursor allowing the operator to select the additional energy capacity by moving the cursor between a value of zero and a value of the calculated current maximum real energy capacity.

15. An apparatus for temporarily extending an autonomy of an electric vehicle comprising a traction battery having a nominal usable energy capacity that is less than a current maximum real energy capacity of the traction battery, the apparatus comprising:

processing circuitry configured to
- calculate the current maximum real energy capacity;
- cause a display of the electric vehicle or a display of a device of an operator of the electric vehicle to display a graphical user interface (GUI) that displays (1) the calculated current maximum real energy capacity, and (2) a first input element that allows the operator to select an arbitrary additional capacity that is less than or equal to, but not greater than, the displayed current maximum real energy capacity and is to be added to the nominal usable energy capacity;
- receive a selection, by the operator via the GUI, of the arbitrary additional energy capacity to be added to the nominal usable energy capacity;
- cause the GUI to display the calculated current maximum real energy capacity together with the selected additional energy capacity selected by the operator; and
- release the selected arbitrary additional capacity, so as to temporarily increase the autonomy of the vehicle.

* * * * *